T. N. MARTIN.
ADJUSTABLE THRUST BEARING FOR CRANK SHAFTS.
APPLICATION FILED JULY 21, 1919.
1,340,396.
Patented May 18, 1920.
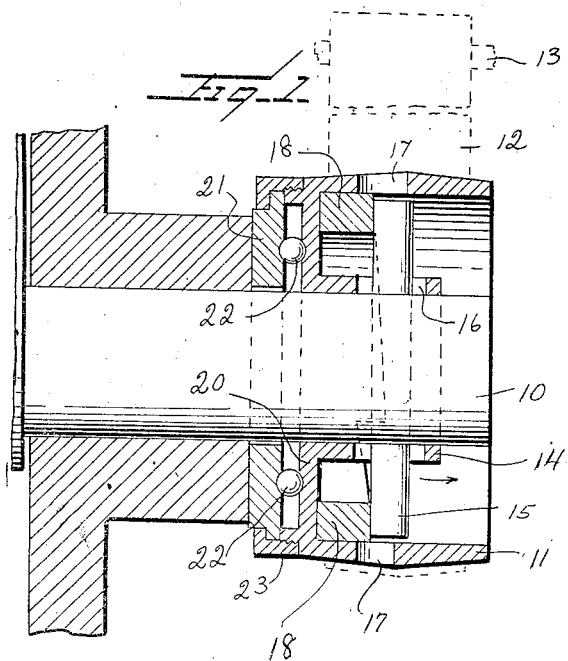
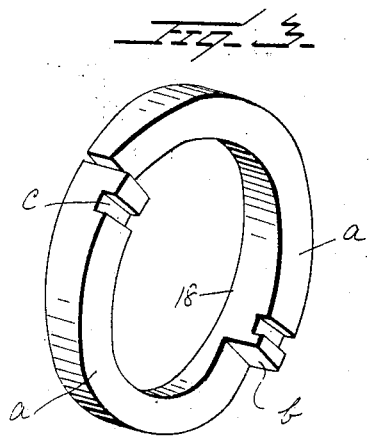
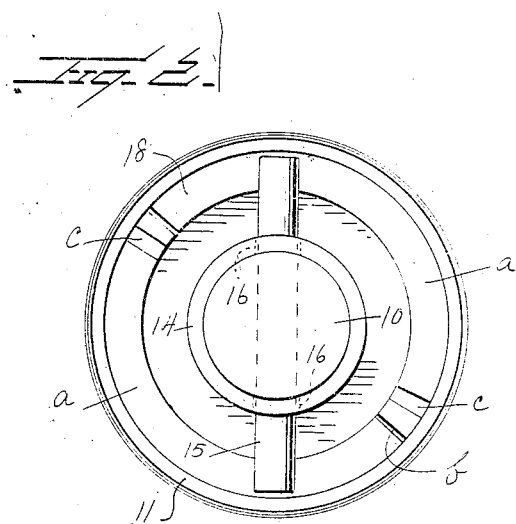
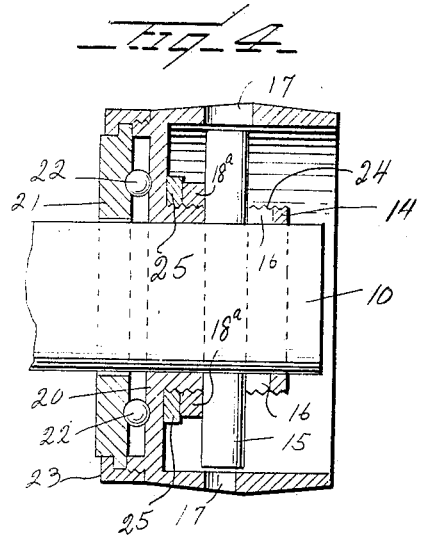
Inventor
T. N. Martin
By Watson E. Coleman
Attorney

UNITED STATES PATENT OFFICE.

THOMAS N. MARTIN, OF MOUNTAIN HOME, ARKANSAS.

ADJUSTABLE THRUST-BEARING FOR CRANK-SHAFTS.

1,340,396.   Specification of Letters Patent.   Patented May 18, 1920.

Application filed July 21, 1919. Serial No. 312,212.

*To all whom it may concern:*

Be it known that I, THOMAS N. MARTIN, a citizen of the United States, residing at Mountain Home, in the county of Baxter and State of Arkansas, have invented certain new and useful Improvements in Adjustable Thrust-Bearings for Crank-Shafts, of which the following is a specification, reference being had to the accompanying drawings.

This invention relates to automobiles, and particularly to the mounting of the crank shaft of a Ford automobile.

In Ford automobiles, the engine when running in a neutral position, either when idling or when running on the road, or when the transmission is being shifted to low gear, has a great tendency to pull rearward, and this rearward pull on the crank shaft causes considerable wear thereon and wear on the bearings, and this wear tends to separate the magneto coil from the magnets. It lets the magnets, therefore, shift too great a distance from the magneto coil and this condition causes very hard starting.

The object of my invention is to provide very simple means whereby this rearward pull or thrust on the crank shaft can be resisted, and whereby the crank shaft may be adjusted from time to time to take up wear and keep the magnets and the magneto coils in proper relation.

And a further object is to provide a mechanism of this kind which is applied within the ordinary fan pulley mounted on the crank shaft.

And another object is to provide a thrust ball bearing in the nature of a ball bearing washer, against which the thrust of this pulley may be borne.

Other objects will appear in the course of the following description.

My invention is illustrated in the accompanying drawings, wherein:—

Figure 1 is a transverse sectional view of one form of my adjustable thrust bearing;

Fig. 2 is a face view of the construction shown in Fig. 1;

Fig. 3 is a perspective view of the cam ring;

Fig. 4 is a like view to Fig. 1 but showing a modification of the thrust bearing.

Referring to these drawings, 10 designates the crank shaft of a Ford automobile. I have not attempted to illustrate the magnets and the magneto coils or like mechanism, as these are old and well known. The usual pulley which is mounted upon the crank shaft by which power is taken to the fan shaft, is designated 11, and is formed to receive and engage with the fan shaft belt 12 running to the fan shaft 13. This pulley is formed with a central hub 14 which is adapted to embrace the crank shaft. Normally this pulley is held to the crank shaft by a transversely extending pin passing through registering apertures in the hub 14 and the crank shaft. Such a pin is illustrated in the drawings and designated 15, but the hub instead of being formed with diametrically disposed perforations fitting the pin, is formed with diametrically disposed, longitudinally extending slots 16 which are longer than the diameter of the pin so as to permit the pin to move axially of the pulley. The crank shaft, however, is apertured to fit the pin. This permits longitudinal play between the crank shaft and pin and the pulley.

The rim of the pulley is formed with diametrically disposed openings 17 through which the pin may be removed. Disposed within the pulley, concentric thereto and between the hub 14 and the rim of the pulley, is a double cam ring 18 which may be in the form of a split ring. The outer face of this cam ring is formed with two cam faces *a*. These faces have their low points in diametrically opposite relation and their high points in diametrically opposite relation, there being a shoulder *b* at the junction of each high portion of the cam face with the low portion of the next adjacent cam face. The high portions of both cam faces are formed with transverse notches *c* whereby a spanner wrench may be inserted and this cam ring rotated. The pin 15 rests upon these cam faces, and it will be obvious now that when the cam ring is rotated in one direction, the pin will be forced outward, and that by rotating this cam ring, the pin and crank shaft will be forced outward, that is in the direction of the arrow in Fig. 1, until the pin rests upon the high portions of the cam faces.

Also surrounding the crank shaft is an annular ball bearing washer constituting the thrust bearing and formed with two annular plates 20 and 21. These plates are apertured at their centers to permit the passage of the crank shaft and work loosely on the crank shaft, and the confronting faces of the plates are formed with raceways to receive the anti-friction balls 22 therein. A cap ring 23 engages the peripheries of these two plates and this may be in the form of a lock nut. By inclosing the balls within a case comprising the two oppositely disposed plates, I make this ball bearing washer dust-proof and prevent the dust from settling within the raceways and on the balls. Where a worn crank shaft is to be trued up, this washer or thrust bearing slips on over the crank shaft and then the fan belt pulley is next fitted on the crank shaft. The adjusting cam ring is then placed inside of the pulley and the pin 15 slipped in place. The pulley is shifted as far as it will go in the crank shaft and then the cam ring is driven around until it pulls the crank shaft forward as far as it will go. This operation pulls forward on the fly wheel, which carries the magnets fastened to it and thus lines up the magnets properly with the magneto coil. Under these circumstances, the engine will start as easily as it would before the crank shaft was worn. The thrust bearing formed with the steel plates 20 and 21 is designed to fit against the engine and take the thrust due to drawing the crank shaft forward.

In Fig. 4 I show another form of my thrust bearing which, in some respects, is simpler and better than that shown in Fig. 1. All the parts of the bearing are the same as that shown in Fig. 1 except that the adjusting ring 18ª instead of having a cam face is perfectly flat on both faces, but is interiorly screw-threaded to engage exterior screw-threads 24 on the hub 14. Also engaging these screw-threads 24 is a lock nut 25. It will be obvious now that the adjusting ring 18ª may be rotated in one direction or the other and as it bears against the pin 15 will cause this pin to shift longitudinally in the slots 16, thus shifting the crank shaft and its allied parts, and that after the ring has been properly adjusted it may be held in this position by the lock nut 25.

The two embodiments of my invention illustrate the principle, and it will be obvious that the principle may be embodied in other forms than those illustrated without departing from the spirit of the invention.

I claim:—

1. The combination with the crank shaft of an automobile, of means for shifting the crank shaft longitudinally comprising a thrust bearing, a pulley having a hub, the hub surrounding the crank shaft and being longitudinally slotted; a pin disposed through the slots of the hub and through the crank shaft, an annular member operatively bearing against the thrust bearing and having a face bearing against the pin, said member being rotatable with the pin but being independently adjustable around the hub to shift the pin and crank shaft relative to the hub.

2. In an automobile, a crank shaft, a thrust bearing surrounding the crank shaft and including confronting plates having anti-friction members between them, a member with a hub fitting the crank shaft and longitudinally slotted, a pin passing through the longitudinal slots and through said hub, and an annular member disposed between the pin and said thrust bearing and having a face bearing against the pin, said member being independently rotatable to shift the pin and crank shaft relative to the hub.

3. The combination with a shaft and a fixed member through which the shaft passes, of a thrust bearing through which the shaft passes and bearing against the fixed member, a rigid member engaged with the shaft, and means engaging the thrust bearing and said rigid member and adjustable to force the shaft longitudinally with relation to the thrust bearing.

4. In a mechanism of the character described, a longitudinally extending shaft, a fixed member through which the shaft passes, the shaft being longitudinally shiftable through the fixed member, a thrust bearing surrounding the shaft and engaging against the fixed member, and means for shifting the shaft longitudinally comprising a pin extending through the shaft, a ring rotatably adjustable and when rotatably shifted bearing against the pin and shifting it and the shaft longitudinally, the pressure on said ring being operatively supported by the thrust bearing.

5. In a mechanism of the character described, a rotative and longitudinally shiftable shaft, a fixed member through which the shaft passes, an annular member loosely mounted on the shaft, a pin passing through the shaft and annular member and having sliding movement in the annular member axially thereof, an anti-friction thrust bearing against which the annular member bears and which engages with the fixed member, and a ring disposed within the annular member concentric to the shaft bearing against the pin, said ring when rotated forcing the pin and shaft longitudinally.

6. In a mechanism of the character described, a longitudinally shiftable shaft, a fixed member through which the shaft passes, a pin extending diametrically across the shaft, an annular member having a central annular hub and through which the pin passes, the hub being longitudinally slotted for the passage of the pin and the exterior of the hub being screw-threaded, an adjusting ring having screw-threaded engagement with the hub and bearing against said pin, a disk freely rotatable on the shaft and abutting against said fixed member, and anti-friction rollers disposed between the annular member and said plate and constituting a thrust bearing.

7. In a mechanism of the character described, a longitudinally shiftable shaft, a fixed member through which the shaft passes, a pin extending diametrically across the shaft, an annular member having a central, annular hub and through which the pin passes, the hub being longitudinally slotted for the passage of the pin and the exterior of the hub being screw-threaded, an adjusting ring having screw-threaded engagement with the hub and bearing against said pin, whereby when the ring is rotated the pin and shaft will be vertically shifted relative to the hub, a lock nut engaging the hub, and anti-friction rollers disposed between the annular member and the fixed member and constituting a thrust bearing.

In testimony whereof I hereunto affix my signature.

THOMAS N. MARTIN.